(12) United States Patent
Karhuketo (10) Patent No.: US 11,100,778 B2
(45) Date of Patent: Aug. 24, 2021

(54) ELECTRONIC LABEL TAG AND ELECTRONIC LABEL TAG SYSTEM

(71) Applicant: MARISENSE OY, Vantaa (FI)

(72) Inventor: Hannu Karhuketo, Tuusula (FI)

(73) Assignee: MARISENSE OY, Vantaa (FI)

( * ) Notice: Subject to any disclaimer, the term of this patent is extended or adjusted under 35 U.S.C. 154(b) by 562 days.

(21) Appl. No.: 14/386,859

(22) PCT Filed: Apr. 10, 2013

(86) PCT No.: PCT/FI2013/050394
§ 371 (c)(1),
(2) Date: Sep. 22, 2014

(87) PCT Pub. No.: WO2013/153282
PCT Pub. Date: Oct. 17, 2013

(65) Prior Publication Data
US 2015/0035674 A1    Feb. 5, 2015

(30) Foreign Application Priority Data

Apr. 11, 2012 (FI) .................................. 20125397

(51) Int. Cl.
*G08B 13/24* (2006.01)
*G06K 19/02* (2006.01)
(Continued)

(52) U.S. Cl.
CPC ....... *G08B 13/2417* (2013.01); *G06K 19/027* (2013.01); *G06K 19/0705* (2013.01);
(Continued)

(58) Field of Classification Search
CPC .......... H01L 24/85; H01L 2924/15311; G06F 3/147; G06F 19/327; G06F 21/34;
(Continued)

(56) References Cited

U.S. PATENT DOCUMENTS

| 4,463,339 | A | * | 7/1984 | Frick | ........................ G08G 1/07 340/642 |
| 5,044,634 | A | * | 9/1991 | Dudley | ................. A63B 57/00 340/323 R |

(Continued)

FOREIGN PATENT DOCUMENTS

| CN | 101031954 A | 9/2007 |
| EP | 1 798 631 A2 | 6/2007 |
| EP | 2 136 321 A1 | 12/2009 |
| EP | 2 216 771 A2 | 8/2010 |
| FI | 20050192 A | 8/2006 |
| FI | 124853 B | 2/2015 |
| GB | 2 419 217 A | 4/2006 |

(Continued)

OTHER PUBLICATIONS

Search Report issued in corresponding Finnish Application No. 20125397 dated Feb. 25, 2013 (in English).

(Continued)

*Primary Examiner* — Fekadeselassie Girma
(74) *Attorney, Agent, or Firm* — Birch, Stewart, Kolasch & Birch, LLP (57) ABSTRACT

An electronic label tag (100) and electronic label tag system (300) wherein electronic label tag (100) comprises machine readable identifier module, communication module for receiving product related information, attachment means for attaching the electronic label tag (100) to product, and display for displaying product related information. The machine readable identifier module of the electronic label tag (100) is configured to activate the communication module and/or display in response to a command received by the machine readable identifier module.

20 Claims, 3 Drawing Sheets

(51) Int. Cl.
    *G06K 19/07*     (2006.01)
    *G06K 19/077*     (2006.01)

(52) U.S. Cl.
    CPC ... *G06K 19/0724* (2013.01); *G06K 19/07707* (2013.01); *G08B 13/242* (2013.01); *G08B 13/2434* (2013.01)

(58) Field of Classification Search
CPC .......... G06F 21/43; G06F 1/32; G06F 1/3203; G06F 1/3293; G09G 2380/04; G09G 2330/02; G09G 2370/16; G06Q 10/087; G06Q 20/20; G06Q 20/3278; G06Q 10/08; G06Q 20/203; H04M 2250/04; H04M 1/72519; H04M 1/7253; H04M 1/7255; G09F 13/18; G09F 13/22; H04W 12/08; H04W 52/0229; G08B 13/06; G08B 13/1472; G08B 13/2402; G08B 13/2414; G08B 13/2434; G08B 13/2448; G08B 13/2471; G08B 21/0261; G08B 21/0275; G08B 21/22; G08B 13/2417; G08B 13/242; B32B 2425/00; B32B 2519/00; B32B 38/10; H04B 5/0031; H04B 5/0037; H04B 5/0062; G06K 19/027; G06K 19/0705; G06K 19/07707; G06K 19/0724
USPC .... 340/10.1, 572.1, 505, 10.34, 10.41, 12.5, 340/539.22, 568.1, 5.91, 691.6, 815.4
See application file for complete search history.

(56) References Cited

U.S. PATENT DOCUMENTS

| | | | | |
|---|---|---|---|---|
| 5,629,693 | A * | 5/1997 | Janky | B60R 25/102 180/287 |
| 5,748,106 | A * | 5/1998 | Schoenian | G07B 15/063 340/7.32 |
| 5,920,261 | A * | 7/1999 | Hughes | G06K 7/0008 340/568.8 |
| 5,955,969 | A * | 9/1999 | D'Hont | G08G 1/017 235/384 |
| 6,002,343 | A * | 12/1999 | Auerbach | G06K 19/07372 340/10.41 |
| 6,084,513 | A * | 7/2000 | Staffer | G08B 13/2417 340/572.1 |
| 6,089,453 | A * | 7/2000 | Kayser | G06Q 30/06 235/378 |
| 6,113,539 | A * | 9/2000 | Ridenour | A61B 5/0002 128/903 |
| 6,339,384 | B1 * | 1/2002 | Valdes-Rodriguez | G07B 15/063 235/384 |
| 6,693,563 | B2 * | 2/2004 | Flick | B60R 25/04 340/540 |
| 6,753,830 | B2 | 6/2004 | Gelbman | |
| 7,098,792 | B1 * | 8/2006 | Ahlf | G08B 13/1427 235/492 |
| 7,564,360 | B2 | 7/2009 | Cote et al. | |
| 7,973,661 | B2 | 7/2011 | Copeland | |
| 8,222,996 | B2 * | 7/2012 | Smith | G06K 19/07703 340/10.1 |
| 8,608,080 | B2 * | 12/2013 | Finn | H01L 24/85 235/492 |
| 8,717,346 | B2 | 5/2014 | Claessen | |
| 8,754,748 | B2 * | 6/2014 | Orlassino | G06K 7/10386 340/10.1 |
| 2002/0089434 | A1 * | 7/2002 | Ghazarian | G06Q 10/08 340/988 |
| 2003/0163287 | A1 * | 8/2003 | Vock | A61B 5/1118 702/187 |
| 2004/0114557 | A1 * | 6/2004 | Bryan | H04W 64/00 370/338 |
| 2004/0148117 | A1 * | 7/2004 | Kirshenbaum | G07C 1/00 702/82 |
| 2005/0012599 | A1 * | 1/2005 | DeMatteo | B60K 37/06 340/425.5 |
| 2005/0152108 | A1 | 7/2005 | Goel et al. | |
| 2005/0234778 | A1 * | 10/2005 | Sperduti | G06Q 20/3278 705/22 |
| 2006/0071925 | A1 * | 4/2006 | Wykoff | G09G 3/3629 345/211 |
| 2006/0143645 | A1 * | 6/2006 | Vock | G01B 7/004 725/9 |
| 2006/0252366 | A1 * | 11/2006 | Eu | E06B 7/32 455/3.06 |
| 2007/0018832 | A1 * | 1/2007 | Beigel | G06K 19/0739 340/572.7 |
| 2007/0080806 | A1 * | 4/2007 | Lax | G08B 13/2402 340/572.1 |
| 2007/0096875 | A1 * | 5/2007 | Waterhouse | G06K 19/07749 340/10.1 |
| 2007/0096880 | A1 * | 5/2007 | Nagai | G06K 19/0717 340/10.41 |
| 2007/0152829 | A1 * | 7/2007 | Lindsay | G06K 19/0717 340/572.3 |
| 2007/0182567 | A1 * | 8/2007 | Stewart | A63B 71/0686 340/572.8 |
| 2007/0273534 | A1 * | 11/2007 | McGinn | G07C 9/00912 340/572.8 |
| 2007/0276944 | A1 * | 11/2007 | Samovar | G07C 9/27 709/225 |
| 2008/0093357 | A1 * | 4/2008 | Norman | B65D 81/34 219/521 |
| 2008/0111675 | A1 * | 5/2008 | Tuttle | G06K 17/00 340/505 |
| 2008/0294488 | A1 * | 11/2008 | Gupta | G06Q 10/087 705/7.26 |
| 2008/0303670 | A1 * | 12/2008 | Seidel | G08B 13/06 340/572.1 |
| 2009/0017871 | A1 | 1/2009 | Brieskorn | |
| 2009/0058659 | A1 * | 3/2009 | Handyside | G08B 15/02 340/572.9 |
| 2009/0121880 | A1 | 5/2009 | Joyce, Jr. et al. | |
| 2009/0159663 | A1 * | 6/2009 | Mullen | G06Q 20/18 235/379 |
| 2009/0243832 | A1 * | 10/2009 | Hyde | A01G 25/167 340/505 |
| 2009/0309736 | A1 | 12/2009 | Heurtier | |
| 2010/0001872 | A1 | 1/2010 | Lian et al. | |
| 2010/0052908 | A1 * | 3/2010 | Doan | G06K 19/0717 340/572.1 |
| 2010/0052909 | A1 * | 3/2010 | Doan | G06K 19/0716 340/572.1 |
| 2010/0163133 | A1 | 7/2010 | Barnes et al. | |
| 2010/0225444 | A1 * | 9/2010 | Nobutsugu | G06Q 10/087 340/5.91 |
| 2010/0308964 | A1 * | 12/2010 | Ackley | H04B 5/0062 340/10.1 |
| 2011/0050427 | A1 * | 3/2011 | Skjellerup | E05B 73/0017 340/572.8 |
| 2011/0057770 | A1 * | 3/2011 | Tsudik | G07F 7/082 340/5.2 |
| 2011/0057799 | A1 * | 3/2011 | Taneff | G08B 21/245 340/573.1 |
| 2011/0068894 | A1 * | 3/2011 | Braun | G06F 21/34 340/5.8 |
| 2011/0102149 | A1 * | 5/2011 | Lin | G06K 7/0008 340/10.1 |
| 2011/0169657 | A1 * | 7/2011 | August | A01K 11/004 340/854.6 |
| 2011/0205201 | A1 * | 8/2011 | Lorkowski | G09G 3/344 345/207 |
| 2011/0234379 | A1 * | 9/2011 | Lee | H04W 88/02 340/10.1 |
| 2011/0289023 | A1 * | 11/2011 | Forster | G06Q 99/00 705/500 |

(56) References Cited

U.S. PATENT DOCUMENTS

| | | | | |
|---|---|---|---|---|
| 2012/0062382 | A1* | 3/2012 | Taneff | G08B 21/245 340/573.1 |
| 2012/0086550 | A1* | 4/2012 | LeBlanc | A61B 5/117 340/5.82 |
| 2012/0154265 | A1* | 6/2012 | Kim | H04W 12/08 345/156 |
| 2012/0253594 | A1* | 10/2012 | Schreiber | G05G 9/047 701/36 |
| 2012/0287095 | A1* | 11/2012 | Cote | G06K 19/07707 345/204 |
| 2012/0326846 | A1* | 12/2012 | Tseng | G06K 19/07707 340/10.3 |
| 2013/0225434 | A1* | 8/2013 | Kay | G01N 33/68 506/9 |
| 2013/0228623 | A1* | 9/2013 | Virella | G06K 7/10 235/454 |
| 2013/0248226 | A1* | 9/2013 | Sime | H05K 1/0373 174/251 |
| 2014/0077953 | A1* | 3/2014 | Yang | G08B 13/2434 340/572.1 |
| 2014/0098131 | A1* | 4/2014 | Fein | G06T 19/006 345/633 |
| 2014/0115493 | A1* | 4/2014 | Kim | H04L 67/10 715/748 |
| 2014/0333417 | A1* | 11/2014 | Sun | G06K 19/07762 340/10.1 |
| 2015/0195890 | A1* | 7/2015 | Forgey | H05B 47/155 315/307 |
| 2015/0250140 | A1* | 9/2015 | Fraser | A01K 29/005 340/573.2 |

FOREIGN PATENT DOCUMENTS

| | | |
|---|---|---|
| JP | 2004531923 A | 10/2004 |
| JP | 2007166606 A | 5/2007 |
| JP | 2009529164 A | 8/2009 |
| JP | 2010015230 A | 1/2010 |
| JP | 2011513856 A | 4/2011 |
| RU | 1779186 C | 12/1995 |
| RU | 2332722 C1 | 8/2008 |
| WO | WO 00/67110 A1 | 11/2000 |
| WO | WO 02/063602 A1 | 8/2002 |
| WO | WO 2005/060699 A2 | 7/2005 |
| WO | WO 2005/060700 A2 | 7/2005 |
| WO | WO 2011/119913 A2 | 9/2011 |

OTHER PUBLICATIONS

Supplementary European Search Report issued in corresponding EP Application No. 13 77 6011 dated Nov. 30, 2015 (in English).

Japanese Patent Office, "Decision of Refusal," issued in connection with Japanese Patent Application No. 2015-504994, dated Mar. 31, 2017.

Russian Patent Office, "Official Action," issued in connection with Russian Patent Application No. 2014145228/08, dated Jan. 18, 2017.

State Intellectual Property Office of the People's Republic of China, "Notification of the Third Office Action," issued in connection with Chinese Patent Application No. 201380019487.1, dated Aug. 23, 2017.

* cited by examiner

ELECTRONIC LABEL TAG AND ELECTRONIC LABEL TAG SYSTEM

FIELD OF THE INVENTION

The invention relates to electronic label tags and electronic label tag systems.

BACKGROUND OF THE INVENTION

Conventionally, the product related information, such as price, is attached to products like clothes with hanging tags made of e.g. paper or similar material. This information can be attached to the product at the place of manufacturing or it can be later added to the product. At least when local information, local price or updated price is to be attached to the product this has to be done manually in the store. The new prices are printed out on paper or a corresponding material, and these pieces with their new price markings are attached manually to existing tags on the products. Thus, an employee must first find the correct product where the tag has to be updated and the new tag is attached in its position. A disadvantage in this arrangement is, among other things, the fact that the arrangement is very laborious and there is a high risk of mistakes. In case of a mistake, a situation may occur, in which the price information on the price tags on the product conflicts with the price information in the cash register system.

Also electronic shelf label systems, ESL systems, are known which offer automatic updating of prices to an electronic label that will facilitate and accelerate the updating of the price information to a significant extent. ESL systems are systems used by retailers for displaying product pricing on shelves. Typically, electronic shelf labels are implemented as electronic display modules that are attached to the front edge of retail shelving. These modules use different technologies to show the current product price and also other information to the customer. A communication network allows the price display to be automatically updated whenever a product price is changed. This automated system reduces pricing management labor costs and improves pricing accuracy.

ESL systems are particularly suitable for use in large shops or supermarkets that offer thousands or tens of thousands product items for sale, whose prices must be updated frequently and correctly.

The electronic price display modules can be updated from a centralized control system via wired or wireless communication. All-wired systems have obvious problems in terms of the layout limitations caused by complicated cabling due to the high number of individual ESL displays. Wireless systems have their major technological bottleneck in the need for individual power supplies for each ESL display unit and requirement for long power supply lifetime, i.e. operational lifetime for the batteries. In addition, the wireless systems need to be able to provide reliable communication channel in an environment that has high number of individual receiver-transmitter units that in order to prolong the battery life, need to operate with minimum transmitting power levels.

A display technology that is suitable for ESL applications is a so called Electronic Paper Display (EPD) that possesses a paper-like high contrast appearance, ultra-low power consumption, and a thin, light form. EPD's aim is to give the viewer the experience of reading from paper, while providing the capability to electronically update the displayed information. EPD's are technology enabled, as one possibility, by electronic ink. Such ink carries an electrical charge enabling it to be updated through electronics. Electronic ink is well suited for EPD's as it is a reflective technology which requires no front or backlight, is viewable under a wide range of lighting conditions, including direct sunlight, and requires no power to maintain an image. Electrical power is only consumed when the displayed data is changed. In order become widely applied in different type of applications, wireless ESL's or corresponding electronically controlled wireless displays are faced with a number of requirements that are partly dictated by the manufacturing process and partly by the end use, for example, the use, environment and manageability in a store by the store personnel.

WO0067110 discloses a display unit for electronic shelf price label system that utilizes electronic ink and EPD technology. The electronic display unit in WO0067110 features a printable electronic display comprising an encapsulated electrophoretic display medium. The resulting electronic display is flexible and has in large measure the applications of a printed display. Further, since the encapsulated electrophoretic display medium used in the present invention can be printed, the display itself can be made inexpensively. The encapsulated electrophoretic display medium is an optoelectronically active material which comprises at least two phases: an electrophoretic contrast media phase and a coating/binding phase. The electrophoretic display medium can form, for example, a full color, multicolor, or two color (e. g. black and white) display. The electrophoretic phase comprises at least one species of encapsulated electrophoretic particles, having distinct physical and electrical characteristics, dispersed in a clear or dyed suspending fluid. The coating/binding phase includes a polymer matrix that surrounds the electrophoretic phase. In this embodiment, the polymer in the polymeric binder is capable of being dried, cross linked, or otherwise cured as in traditional inks, and therefore a printing process can be used to deposit the encapsulated electrophoretic display medium onto a substrate.

Conventional electronic shelf labels are not suitable to be attached to the products such as clothes because they can be heavy and have no suitable attaching means. Also if conventional electronic shelf labels would be attached to the products at the manufacturing state they would have to be turned on at the manufacturing site so that information could be programmed to the labels and information of the labels could be read during manufacturing and delivering phases. This way electronic labels would consume energy during transportation from manufacturing site and this would result in low or empty battery of electronic label when the products are delivered to the stores and put to sale.

SUMMARY OF THE INVENTION

It is an aim of the present invention to solve the above-mentioned problems and simultaneously provide an arrangement for an electronic label tag and electronic label tag system.

The present invention solves problems of prior art by providing an electronic label tag which comprises a machine readable identifier module, a communication module for receiving product related information, an attachment means for attaching the electronic label tag to product and a display for displaying product related information. The machine readable identifier module of the electronic label tag is configured to activate the communication module and/or display in response to a command received by the machine readable identifier module.

In one embodiment of the invention all modules which consume energy can be deactivated and they can be activated by the machine readable identification module of the tag, which is machine readable identification module e.g. an RFID-tag.

In one embodiment of the invention electronic label tag comprises two antennas. First antenna is an RFID-antenna which complies with RFID-standard. The RFID-antenna can be used to communicate and program information to the electronic label tag e.g. at the manufacturing plant. Second antenna is an antenna for radio communication with base stations of the electronic label tag system.

With the solution of the present invention it's possible to provide an electronic label tag which can be attached to the products and which can present updateable information to the users. Benefit of the structure of the electronic label tag according to the invention when compared to prior art solutions is that the solution of this invention is lighter in weight than prior art solutions and therefore weight-sensitive strains are not caused e.g. to textiles.

Also because modules of the electronic label tag can be activated and/or deactivated by the machine readable identification module, the tags can be attached to the product at manufacturing phase, information can be preloaded to tags and energy consumption can be minimized when tags are not used like in the situation when they are being delivered to stores. It's important to minimize energy consumption of the electronic label tags because the electronic label tags spend most of their time at the manufacturing site, on delivery from manufacturing site to stores or from stores to manufacturing site and only a part of their life on sale in a store where full functions of the labels have to be activated. Therefore minimizing energy usage of the electronic label tags when full functionality is not needed, improves considerable estimated lifetime of an electronic label tag.

An advantage in the embodiment with two antennas is that e.g. manufacturer and their system needs only standard RFID-equipment for being able to communicate with electronic label tags whereas more advanced radio communication can be used in stores because of second antenna. This way single electronic label tag can communicate using two different systems.

DESCRIPTION OF THE DRAWINGS

In the following, the invention will be described in more detail by means of an embodiment example with reference to the appended drawings, in which.

DETAILED DESCRIPTION OF THE INVENTION

Figure 1:
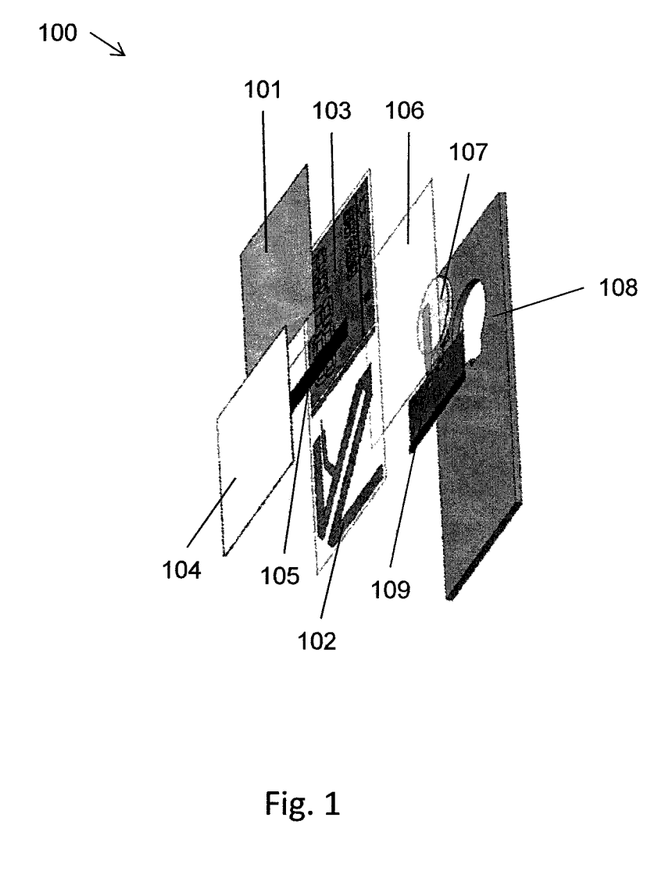
FIG. 1 presents an example implementation of an electronic label tag.

FIG. 1 presents an example embodiment of an electronic label tag 100. The electronic label tag 100 has a layered structure. It consists essentially of a flexible e-paper display 101 comprising e-paper display material, a backplane layer 103 as a flexible circuit board having an electrode structure for controlling the display, a battery 107, which can be substantially rigid or flexible, and wherein the thickness of said battery is greater than the thickness of said flexible display layer 101 and the thickness of said flexible backplane layer 103, and a resilient layer 108 having a cut-out space for said battery 107, wherein said resilient layer 108 is arranged to provide a substantially even total thickness of said tag.

Also energy harvesting methods may be used to provide energy to the electronic price label, such as solar or photovoltaic cells. Also capacitors, such as electric double-layer capacitors, i.e. supercapacitors, can be used instead or with the battery.

The display is arranged to display the information related to the product. Also other product information can be added to tag such as name of the product, logo and/or some other information relating to the product. The information which is in the display can be e.g. price, sale price and/or discount.

One layer of the display is, for example, an active ink layer. The ink layer contains a number of microcapsules filled with liquid and containing, for example, substantially black particles with a positive surface charge and substantially white particles with a negative surface charge, whose location in the microcapsules is controlled by an electric field so that at the desired display segments, the black particles are on top, wherein said display segments look black when viewed from above, and at the other display segments, the white particles are on top, wherein these display segments look white when viewed from above. The background of the display consists of the same microcapsules, wherein, for example, the price information can be displayed as dark numbers against a light background, or vice versa, if desired. Such a display used can be, for example, the electrophoretic microcapsule display laminate disclosed in Finnish patent application No. FI 20050192. Instead of segment display type, the display type can also be pixel type display.

The electronic label tag further comprises wireless communication capabilities with at least one antenna 102 consisting of any shape e.g. two triangular antenna patterns on the same flexible circuit board as the display control, as the ESL-module is implemented as semi-active RF tags that is powered from incident RF communicating via modulated backscatter, and a separate flexible circuit board. The electronic label tag can comprise also further antennas.

In one embodiment of the invention the electronic label tag comprises two antennas. First antenna is an RFID-antenna which complies with RFID-standard. The RFID-antenna can be used to communicate and program information to the electronic label tag e.g. at the manufacturing plant. Second antenna is an antenna for radio communication with base stations of the electronic label tag system. Advantage in this embodiment is that manufacturer and their system needs only standard RFID-equipment for being able to communicate with electronic label tags whereas more advanced radio communication can be used in stores. In one embodiment of the invention a machine readable identifier module of the electronic label tag comprises the first antenna and a communication module of the electronic label tag comprises the second antenna.

The battery 107 has been encapsulated in a cut-out space by laminating said display 101, backplane 103, control circuit board and resilient layers 108 together. Further, the display layer 101, the backplane layer 103, the resilient layer 108 and the battery 107 are located between two outside protective layers (not shown) forming a body of the electronic label tag for an electronic label tag suitable to be attached to a product. Also a protective layer 106 can be arranged at the bottom of the backplane layer 103 to prevent moisture from getting to display layer 101 which is sensitive to moisture variations. The rigid component has been attached to the separate flexible printed circuit board 109 operating as a submodule under the backplane and the antenna. Back-plane layer 103 as a flexible circuit board having an electrode structure for controlling the display and separate flexible printed circuit board 109 can be considered to form control electronics of the electronic label tag.

The backplane and the antenna circuit board 103 and the electronic label tag control circuit board are patterned plastic films (PET or PC or PVC or polyimide) with patterned conductive copper layers. The forming and patterning of the conductors can be made using any method known as such for a person skilled in the art, for example by direct printing of conductive ink or by etching of a thin metal layer. The lower surface of the backplane 103 has display segment lead lines patterned in a similar way. Each display segment is electrically connected to a corresponding display segment lead line for example through a preferably laser processed via. Also other ways of providing feed-through vias are possible as is evident for a person skilled in the art. In order to establish an electrical contact from the back-plane segments to the display front electrode, which is in this example on the front surface of the flexible electronic display web, an electrically conducting tape 105 is laminated on the backplane area acting as a front electrode feed line. Alternatively and instead of an electrically conducting tape 105, electrically conducting paste or similar material with adhesive nature may be dispensed on the backplane web to make contact with the front plane electrodes.

The electronic label tag 100 can have multiple memory locations for the information, for example for price information. The electronic labels 100 can also comprise multiple different views stored in the memory locations i.e. different pages that include different information to be displayed. Staff can have its own pages which can be displayed only with a special staff equipment. Also loyalty customers or other group of users can have own pages which can be activated using e.g. loyalty card. E.g. Loyalty Card holders can have special price displayed for them when loyalty card is brought close to the electronic label tag.

Electronic label tag 100 has also a machine readable identifier module. The machine readable identifier module can comprise complete RFID tag characteristics compliant with RFID-standards, so it is able to fully utilize the existing RFID infrastructure. Machine readable identifier module can comprise a bar code. The bar code can be permanently printed to the electronic label tag 100 or it can be shown in the display of the electronic label tag 100. The machine readable identifier module comprises the ID number of the electronic label tag. The ID number can be encrypted.

Tag layout of the electronic label tags 100 can be customized to many colors and equipped with logos, text, etc. just as desired.

Electronic label tag 100 can have attachment means (not shown in FIG. 1) by which the electronic label tag 100 can be attached to products. Also external attachment means can be used to attach the electronic label tags to products. External attachment means can be e.g. at least partly transparent pockets.

Figure 2:
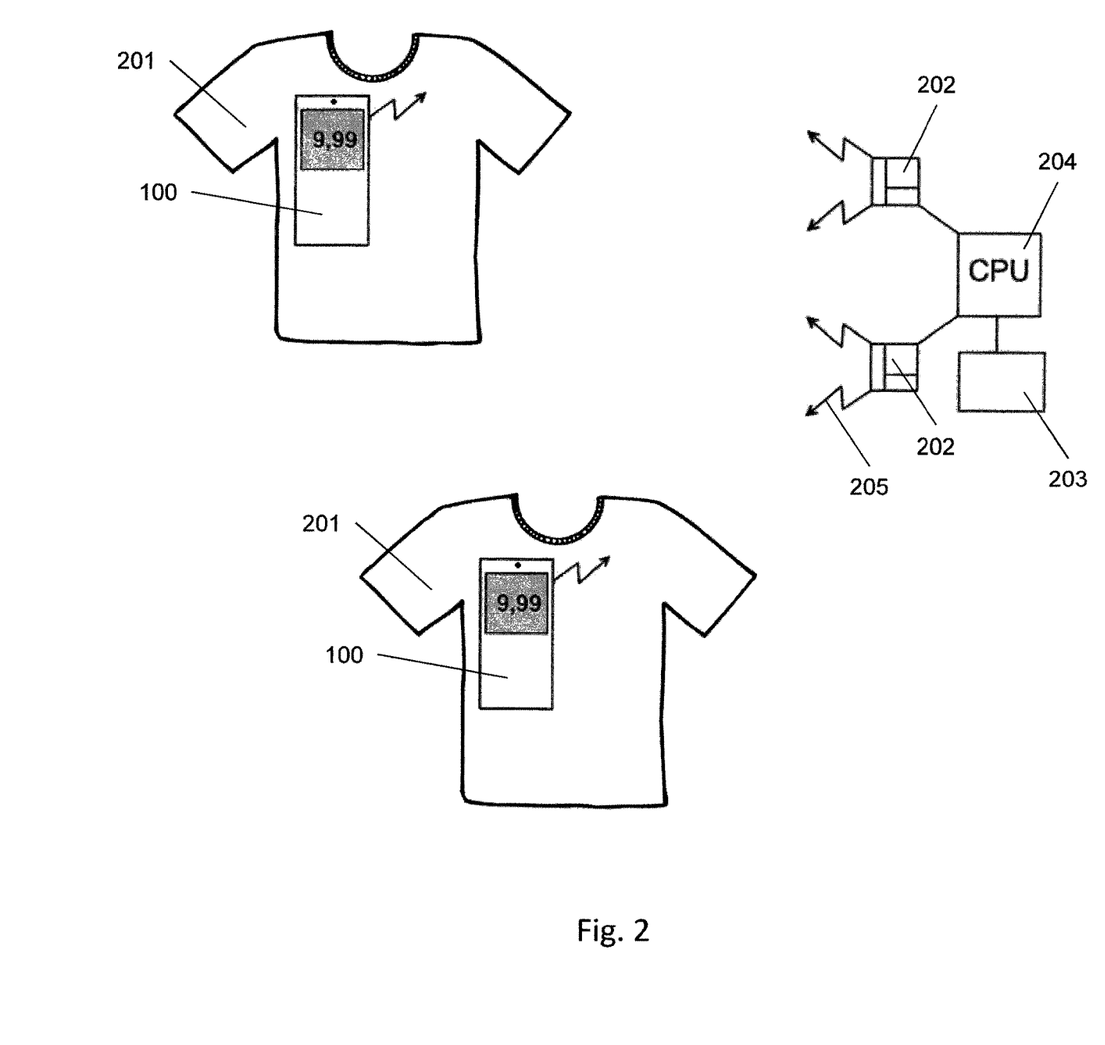
FIG. 2 presents a schematic and simplified view of an example arrangement of the electronic label tag system in a supermarket or in corresponding sales premises.

FIG. 2 shows schematically, as an example, a typical arrangement of the electronic label system in a supermarket or similar sale environment.

Products 201 are equipped with electronic label tags 100 that are typically attached to the products 201. Electronic label tags 100 are attached to the products 201 such that they are easily perceivable for the customers.

Furthermore, the electronic label system comprises at least a central processing unit 204 connected to a base station 202 or other communication means, via which it is possible to transmit, for example, updated price information and other control information to the electronic label tag 100. Furthermore, the system may comprise scanners 203, which can be e.g. RFID-readers and/or barcode readers, located at cash registers and connected to the cash register system, for scanning the price, wherein the cash register system and the electronic labels always have the same up-to-date information on the prices of the products. Furthermore, the central processing unit 204 may be coupled to other controlling and supporting systems, e.g. to a point of sale system of a store. The wireless connection between the central processing unit 204 and the electronic label tags 100 is illustrated with arrows 205.

The electronic label tags 100 communicate in a wireless manner with the base station 202. Wireless communication method may be based on any known wireless communication technology, but in order to save battery life of the electronic label tags 100, passive backscatter radio communication is preferred. In this approach the base stations 202 actively send radio signals and instead of answering with active radio transmission, the electronic label tags 100 do not use a radio transmitter; instead, they answer by modulating the reflected power of the base station signal. The modulation is achieved, typically, by changing the load state of the antenna in the electronic label tags 100, for example, by connecting and disconnecting the antenna between the ground and non-ground potential. This modulation of the backscattered signal allows for the electronic label tags 100 to answer to the base stations and further to the store level server. The system can be configured to use certain frequency band, e.g. 868 MHz frequency band, for communication between electronic label tags and base station(s). In one embodiment of the invention the system can use multiple frequency bands for communication between electronic label tags 100 and base station(s) 202 and/or different kind of diversity techniques. Electronic label can use its antenna or one of its antennas for communicating with the base station with backscatter radio communication.

Each electronic label tag 100 can be identified by its own identification code that the electronic label tag 100 in question knows to listen for in the transmission from the base station 202. After receiving new information, instructions or commands from the store server via base station 6, the electronic label tag 100 can acknowledge the reception of these instructions by using the reflected backscattering modulated properly and timely for the store level server to identify that the response is coming from the electronic label tag 100 in question. To facilitate that the store server may have a certain listening period after a transmission directed to a certain electronic label tag 100 for giving the module possibility to answer during that time.

In one embodiment of the invention communication module can comprise an active radio transmitter instead of backscatter radio communication means. In this embodiment the radio transmitter is preferably low power RF-transmitter or transceiver.

Information stored to electronic label tags and communication between the electronic label tags and base stations can be encrypted.

Figure 3:
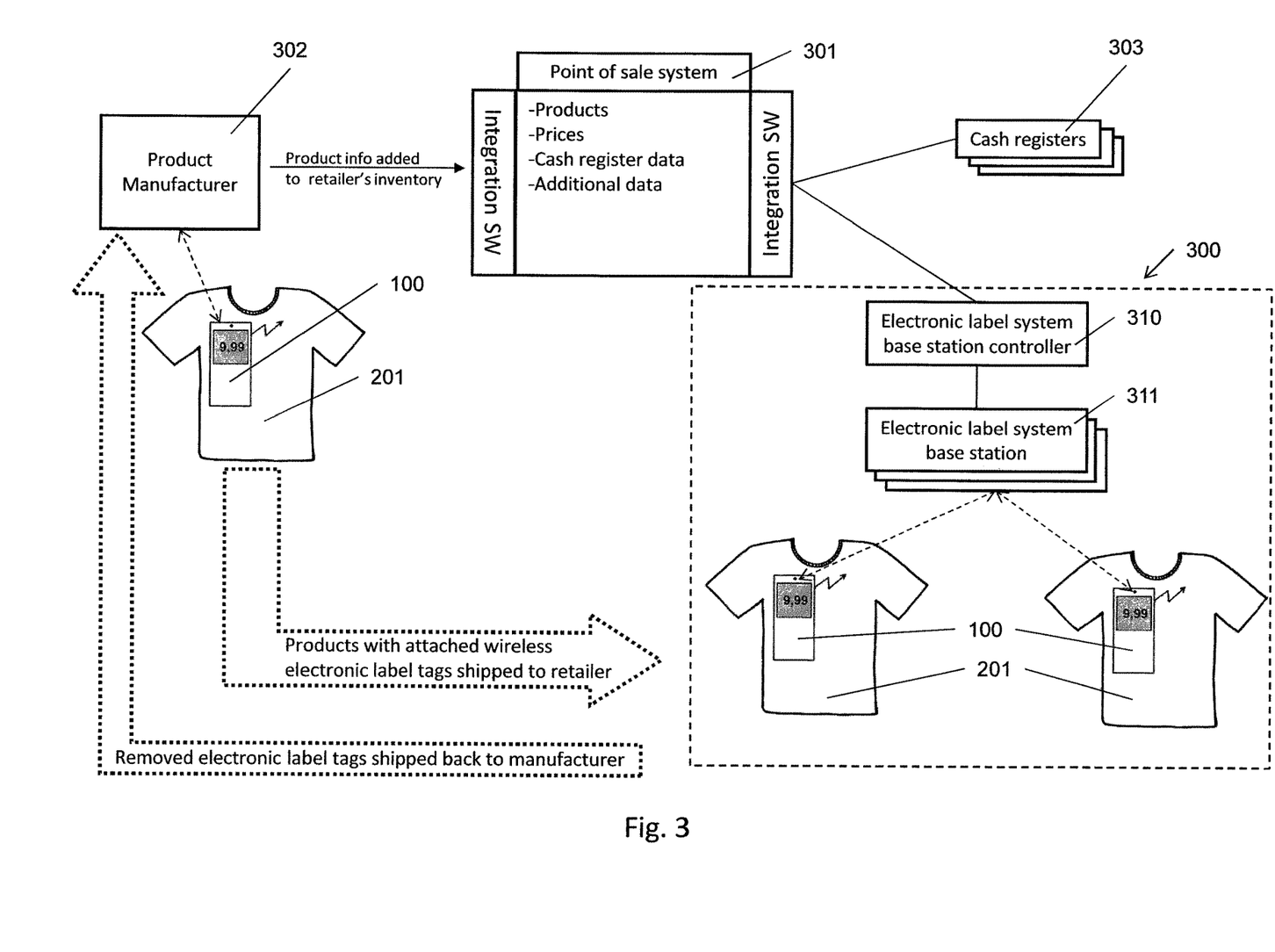
FIG. 3 shows an example implementation of an electronic label tag system with manufacturer management system, point of sale system and electronic label system.

FIG. 3 presents an example implementation of the electronic label management and label system. The system comprises a point of sale system 301 of a store or chain of stores and an electronic label system 300 installed in stores. Product manufacturer, from where the store or chain of stores order products, can have an own management system 302 which has an interface point to sale and/or inventory system of the store or chain of stores.

Point of sale system 301 is used to manage prices, stock, scales data, cash register data or other similar sale or product related data of a store. The product manufacturer's management system 302 can communicate with point of sale system of a store through an interface. The point of sale system can be connected through an interface also to cash registers 303 and an electronic label system. Trough the interface, the point of sale system 301 can e.g. update information on cash registers 303 or gather information on activities such as sales on the cash registers 303 or scales.

The electronic label system 300, which is connected to the point of sale system 301, can be used to change and present prices to the customers. The electronic label system 300 comprises electronic label system base station controller 310, one or more base stations 311 and one or more electronic labels 100. Base stations 311 of the electronic label system 300 are installed in stores and are typically connected in a wired or wireless manner, for example, via Ethernet connection to the base station controller 310. The base station controller 310 can be further connected to a store level server containing the price and other product information.

When manufacturing or packaging products, it's preferable to add the tags to products already at the packaging stage e.g. because of salary and manufacturing costs. Therefore electronic label tags 100 will be sent to clothing manufacturing plant and labels are attached to products at the factory. When the products are manufactured and packaged their IDs can be listed with RFID gates if they are in use or with bar code reader if bar code is used in the electronic label tags 100. This information can be used also for theft control monitoring before the products are put for sale in the store.

For example RFID reader is very useful when products are on their way to from manufacturer to retailer. The packages of products can be monitored and IDs of products can be listed and already at this stage introduced into logistics, inventory or POS systems of the chain of stores to be followed. This way, products can be monitored through the entire logistics chain and it can be known exactly where each item is and when each item can be at store.

When the products with their attached electronic label tags 100 are on their way from manufacturer to store, the battery consumption of the unit has to be kept minimal or zero so that when the product with its tag is unpacked in the store and displayed to customers, the battery level is still good. Therefore battery consuming modules, such as communication module or display, of the electronic label tags are deactivated to a state where their energy consumption is minimal or zero e.g. at the manufacturing site after the tag has been programmed to comprise ID of the product and/or other data of the tag has been set. The product manufacturer's system can communicate with the tag e.g. via RFID-module of the electronic label equipped with an RFID-antenna. In this case manufacturer doesn't need infrastructure of the electronic label tag system with base stations but only standard RFID-equipment is needed to communicate with electronic label tags.

During the delivery the energy consumption is kept minimal and for example if display and communication modules are complete asleep 20 nA battery can last 80 years. In one embodiment of the invention when energy consuming modules, such as display and/or communication module, of the electronic label tag are deactivated, the electronic label doesn't consume energy at all.

When a delivery of products arrives to the store or chain of stores, the deactivated modules have to be activated again to get the tag fully functional. This can be done e.g. with RFID of the electronic label tag and IT-system in a store. The POS/inventory system of the store has already a list of the products sent from the factory, if the factory has sent information to the POS/inventory system before sending the products. At the store, the packages can be marked as received e.g. by reading their machine readable identifier module e.g. with bar code reader, manually or with RFID-reader. The activation of deactivated modules can be done by e.g. by using RFID-reader or by other means. By activating the deactivated modules the modules are powered up and become functional.

In activating the electronic label tag's modules with RFID-equipment, the electronic label tag receives energy from RFID-equipment, such as RFID-reader, for activating the modules. In one embodiment of the invention the electronic label consumes energy only when display module or/and communication module of the electronic label tag are in activated state.

After activation electronic label tag system starts to scan all the products by radio transmission. Since electronic label tags 100 have been activated, the new activated tags join the electronic system and system sends updated product information to the tags comprising e.g. price information. When electronic label tags 100 confirm receiving the updated information, the system can record the product with its electronic label tag 100 to the inventory and this way inventory of the store can be updated to include the newly joined tags with corresponding products. The products can also be updated to received/in shop status already before sending updated information to electronic label tags 100. With electronic label system a complete real-time inventory can be achieved at every moment, and at the chain-store level. Now prices can be updated to electronic label tags whenever wanted by POS-system and electronic label system or device connected to either of these system, e.g. a mobile phone, a computer.

If an electronic label tag 100 has not made the connection system, product related information, such as price, is not displayed in the display of the tag. Therefore it's easy to spot broken tags and new label can be manually changed to replace the damaged tag.

The inventory or POS system can compare reported list of sent items from manufacturer of the product with list of received products and form a report automatically of lost items.

When a party wants to change price of a certain product in one or more stores, a price change request can be sent to the point of sale system 301 of a store or a chain of stores. When the point of sale system 301 receives the request it checks that the request is valid and that the party is authorized to make a change to a price of a certain product. Also other restrictions can be checked, e.g. certain minimum or maximum price limits for a specific product.

If the price change request is valid, the point of sale system 301 changes the price of the product in its own database. After the price is updated in the point of sale system database, the point of sale system can update price information also in cash registers and electronic label system 300.

When price information is changed in the electronic label system 300, this information will be delivered through the base stations to individual electronic labels.

When the customer selects a product and brings it to cash register the electronic label tag 100 will be deactivated and removed from the product with a removal device. The electronic label tag 100 falls into a nearly complete sleeping state waiting for the next use. In the deactivation e.g. communication module and display module can be deactivated, i.e. put into sleep-mode. At the same POS and inventory system can update the product to be sold. After this electronic label tags can be sent back to the factory to be reprogrammed and attached to new product.

The electronic label tag 100 and electronic label tag system 300 can offer also alarm features. If the label tag has RFID-functionality, the electronic label tag can offer the normal gate alarm features available at no additional cost if the store is already using gate alarm system. The alarm can be made in this case immediately if the tag is exported through the port.

Electronic label tag 100 can be attached to his product with its attachment means, e.g. with loop such as plastic covered metal loop or a pin attachable to electronic label tag, which can be removed by standard magnetic-remover. The system can give an alarm e.g. within 30 seconds if the attachment means is removed and/or opened by force or the metal loop is ripped or cut off. The alarm can be silent or loud and/or for personnel only. The alarm can also be done if the radio connection to tag is lost. This can be due to disturbing the radio by e.g. wrapping the tag to metal shield or because tag is being damaged. An alarm can also be made if the tag is exported away from the base station area.

In one embodiment of the invention, if alarm is made, the electronic label tag 100 which caused the alarm has to be reset using inventory or POS system of the store.

The invention relates to an electronic label tag 100 for an electronic label tag system, the electronic label tag 100 comprising a machine readable identifier module, a communication module for receiving product related information and a display for displaying product related information. The electronic label tag 100 further comprises attachment means for attaching the electronic label tag to a product 201. The machine readable identifier module is configured to activate the communication module and/or display in response to a command received by the machine readable identifier module.

In one embodiment of the invention machine readable identifier module comprises an RFID-tag.

In one embodiment of the invention electronic label tag further comprises first and second antenna and first antenna is an RFID-antenna which complies with RFID-standard and second antenna is an antenna for radio communication with base stations of the electronic label tag system.

In one embodiment of the invention machine readable identifier module comprises a bar code.

In one embodiment of the invention communication module communicates with a base station of an electronic label system by reflecting back a signal it receives.

In one embodiment of the invention communication module and/or display are configured to be deactivated.

In one embodiment of the invention machine readable identifier module is configured to deactivate the communication module and/or display in response to a command received by the machine readable identifier module.

In one embodiment of the invention electronic label tag consumes no energy when communication module and/or display are in deactivated state.

In one embodiment of the invention the display is an electronic ink display, such as a bistable E Ink-segment display.

In one embodiment of the invention product related information is price of the product, sale price of the product and/or amount of discount.

In one embodiment of the invention attachment means is a pin attachable to electronic label tag 100, which can be removed by a magnetic-remover In one embodiment of the invention attachment means is a plastic covered metal loop.

In one embodiment of the invention electronic label tag 100 comprises anti-theft features.

In one embodiment of the invention communication module comprises an antenna and is configured to communicate with on 868 MHz frequency band, 2.4 GHz frequency band or any other frequency band allowed to be used for an electronic label tag system.

In one embodiment of the invention electronic label tag 100 is a hanging tag.

The invention relates also to an electronic label system 300 which comprises plurality of electronic label tags according any previous claims and at least one base station 202, 311 configured to send and receive information with any of the electronic labels.

In one embodiment of the invention the system is configured to give an alarm signal.

In one embodiment of the invention system is configured to give alarm signal for an electronic label tag if the base station 202, 311 can't communicate with the electronic label tag 100 and/or if attachment means of the electronic label, which is a metallic loop, is cut.

In one embodiment of the invention electronic label system 300 further comprises security ports and alarm signal is given based on the response from security ports when electronic label tag 100 is exported through the security port.

Although exemplary embodiments of the present invention have been described with reference to the attached drawings, the present invention is not limited to these embodiments, and it should be appreciated to those skilled in the art that a variety of modifications and changes can be made without departing from the spirit and scope of the present invention. Embodiments described in the description in combination with other embodiments can be also used as separate embodiments.

The invention claimed is:

1. An electronic label tag (100) for an electronic label tag system, the electronic label tag (100) comprising:
    a flexible e-paper display (101) including an e-paper display material, a backplane layer (103) forming a circuit board having an electrode structure for controlling the display, a battery (107) and a resilient layer (108);
    a machine readable identifier module,
    a communication module for receiving product related information,
    a display module being provided on the e-paper display material for displaying product related information,
    said electronic label tag (100) further comprises:
        attachment means for attaching the electronic label tag (100) to a product (201),
        wherein the machine readable identifier module activates the communication module and the display module in response to a command received by the machine readable identifier module; and
        wherein the battery is operably attached to the electronic label tag and is selectively deactivated to a state where energy consumption of the battery is minimal or zero when the electronic tags (100) are not in use and thereafter being activated when the electronic tags (100) are in use.

2. An electronic label tag (100) according to claim 1 wherein machine readable identifier module comprises an RFID-tag.

3. An electronic label tag (100) according to claim 2 wherein electronic label tag further comprises first and second antenna said first antenna is an RFID-antenna which complies with RFID-standard and said second antenna is an antenna for radio communication with base stations of the electronic label tag system.

4. An electronic label tag (100) according to claim 1 wherein machine readable identifier module comprises a bar code.

5. An electronic label tag (100) according to claim 1 wherein communication module communicates with a base station of an electronic label system by reflecting back a signal it receives.

6. An electronic label tag (100) according to claim 1 wherein the communication module and the display module are configured to be deactivated.

7. An electronic label tag (100) according to claim 6 wherein machine readable identifier module is configured to deactivate the communication module and the display module in response to a command received by the machine readable identifier module.

8. An electronic label tag (100) according to claim 6 wherein the electronic label tag consumes no energy when the communication module and the display module are in deactivated state.

9. An electronic label tag (100) according to claim 1 wherein the display is selected from the group consisting of an electronic ink display and a bistable E Ink-segment display.

10. An electronic label tag (100) according to claim 1 wherein product related information is price of the product, sale price of the product and/or amount of discount.

11. An electronic label tag (100) according to claim 1 wherein attachment means is a pin attachable to electronic label tag (100), which can be removed by a magnetic-remover.

12. An electronic label tag (100) according to claim 1 wherein attachment means is a plastic covered metal loop.

13. An electronic label tag (100) according to claim 1 wherein electronic label tag (100) comprises anti-theft features.

14. An electronic label tag (100) according to claim 1 wherein communication module comprises an antenna and is configured to communicate with on 868 MHz frequency band, 2.4 GHz frequency band or any other frequency band allowed to be used for an electronic label tag system.

15. An electronic label tag (100) according to claim 1 wherein electronic label tag (100) is a hanging tag.

16. An electronic label system (300) characterized in that the system comprises:
   plurality of electronic label tags according to claim 1 and at least one base station (202, 311) configured to send and receive information with any of the electronic labels.

17. An electronic label tag (100) according to claim 2 wherein machine readable identifier module comprises a bar code.

18. An electronic label tag (100) according to claim 1 wherein the attachment means is a metal loop.

19. An electronic label tag (100) according to claim 1 wherein the system is configured to give an alarm signal for an electronic label tag if a base station (202, 311) cannot communicate with the electronic label tag (100) and/or if attachment means of the electronic label is cut.

20. An electronic label system (300) according to claim 19 wherein electronic label system (300) further comprises security ports and the alarm signal is given based on the response from security ports when the electronic label tag (100) is exported through the security port.

* * * * *